(12) United States Patent
Barua

(10) Patent No.: US 11,787,120 B2
(45) Date of Patent: Oct. 17, 2023

(54) SYSTEMS AND METHOD FOR PREDICTING DISTORTION OF GREEN BODY PARTS DURING SINTERING

(71) Applicant: GENERAL ELECTRIC COMPANY, Schenectady, NY (US)

(72) Inventor: Ananda Barua, Glenville, NY (US)

(73) Assignee: General Electric Company, Schenectady, NY (US)

( * ) Notice: Subject to any disclaimer, the term of this patent is extended or adjusted under 35 U.S.C. 154(b) by 232 days.

(21) Appl. No.: 17/092,524

(22) Filed: Nov. 9, 2020

(65) Prior Publication Data

US 2022/0143922 A1 May 12, 2022

(51) Int. Cl.
*B29C 64/393* (2017.01)
*G01N 3/08* (2006.01)
(Continued)

(52) U.S. Cl.
CPC .......... *B29C 64/393* (2017.08); *B29C 64/153* (2017.08); *G01N 3/08* (2013.01); *B33Y 50/02* (2014.12)

(58) Field of Classification Search
CPC ..... B29C 64/393; B29C 64/153; B33Y 50/02; B33Y 40/20; B33Y 50/00; B28B 11/243;
(Continued)

(56) References Cited

U.S. PATENT DOCUMENTS 9,636,872 B2   5/2017  Batchelder
9,856,390 B2   1/2018  Bredt et al.
(Continued)

FOREIGN PATENT DOCUMENTS

WO   2017200525 A1   11/2017
WO   2018200383 A9    1/2018
(Continued)

OTHER PUBLICATIONS

Zhang Kaiwen et al: "Numerical simulation and experimental measurement of pressureless sintering of stainless steel part printed by Binder Jetting Additive Manufacturing", Additive Manufacturing, Elsevier, NL, vol. 47, Sep. 17, 2021 (Sep. 17, 2021), XP086891795, ISSN: 2214-8604, DOI: 10.1016/J.ADDMA.2021.102330.
(Continued)

*Primary Examiner* — Michael J Brown
(74) *Attorney, Agent, or Firm* — Dinsmore & Shohl LLP

(57) ABSTRACT

A method of predicting a post-sintering geometry of a green body part includes determining stress differentiating material properties of a material configuration of the green body part by physically measuring the stress differentiating material properties of the material configuration and identifying a plurality of stress regions in the green body part via a first sintering analysis of the green body part. Each stress region is associated with a portion of the green body part subjected to a particular stress state during sintering. The method also includes assigning different sets of stress differentiating material properties to each of the plurality of stress regions to form a stress-simulated green body part and predicting the post-sintering geometry via a second sintering analysis of the stress-simulated green body part.

20 Claims, 9 Drawing Sheets

(51) Int. Cl.
*B29C 64/153* (2017.01)
*B22F 10/80* (2021.01)
*B33Y 50/02* (2015.01)

(58) Field of Classification Search
CPC . B28B 17/0081; G06F 30/17; G06F 2113/10;
G06F 2119/18; G06F 30/23; Y02P 10/25;
Y02P 90/02; B22F 2999/00; B22F 10/80;
B22F 10/14; G01N 3/08
USPC .......................................................... 700/108
See application file for complete search history.

(56) References Cited

U.S. PATENT DOCUMENTS

| | | |
|---|---|---|
| 10,569,526 B2 | 2/2020 | FrantzDale et al. |
| 10,611,091 B2 | 4/2020 | Sterenthal et al. |
| 2018/0307209 A1* | 10/2018 | Chin .................. B22F 10/00 |

FOREIGN PATENT DOCUMENTS

| | | |
|---|---|---|
| WO | 2018031594 A1 | 2/2018 |
| WO | 2019112661 A1 | 6/2019 |
| WO | 2020006237 A1 | 1/2020 |

OTHER PUBLICATIONS

Sahli M et al: "Numerical simulation and experimental analysis of solid-state sintering response of 316 L stainless steel micro-parts manufactured by metal injection molding", The International Journal of Advanced Manufacturing Technology, Springer, London, vol. 79, No. 9, Mar. 14, 2015 (Mar. 14, 2015), pp. 2079-2092, XP035521791, ISSN: 0268-3768, DOI: 10.1007/S00170-015-6983-8.
Extended European Search Report for EP Application No. 21204939.9 dated Apr. 12, 2022 (10 pages).

* cited by examiner

SYSTEMS AND METHOD FOR PREDICTING DISTORTION OF GREEN BODY PARTS DURING SINTERING

BACKGROUND

Field

The present specification generally relates to additive manufacturing. More particularly, the present specification is directed to systems and methods for predicting distortion of workpieces printed via additive manufacturing techniques.

Technical Background

Additive manufacturing, which may also be referred to as 3D printing, is a process in which material is built up layer-by-layer to form an object. Binder jetting is an additive manufacturing technique that uses a binder to join particles of a powder to form a three-dimensional object. In particular, the binder is jetted onto successive layers of the powder in a build volume, where layers of the powder and the binder adhere to one another to form a three-dimensional object. The powder may be, for example, polymers, metals, ceramics, or the like. The binder-printed part may be referred to as a "green body part," which may be subjected to subsequent processing to provide a densified final part. For example, the green body part may be inserted in a sintering furnace that heats the green body part to elevated temperatures (e.g., greater than or equal to about 500° C.) to remove the binder and solidify the powder particles to one another. Solidification of the green body part may result in distortion of the green part's shape.

For example, as the green body part shrinks from sintering-induced densification, different portions of the green body part may be subjected to varying degrees of forces such as gravity and friction that subject different portions of the green body part to different loads, leading to differing degrees of distortion in the green body part. As such, to produce final parts from the green body parts having shapes that conform to an input model, such distortion must be accounted for in the process of printing the green body part.

SUMMARY

According to an embodiment of the present disclosure, a method of predicting a post-sintering geometry of a green body part after sintering includes determining, by a computing system, stress differentiating material properties of a material configuration of the green body part by physically measuring the stress differentiating material properties of the material configuration. The method also includes identifying, by the computing system, a plurality of stress regions in the green body part via a first sintering analysis of the green body part. Each stress region is associated with a portion of the green body part subjected to a particular stress state during sintering. The method also includes assigning, by the computing system, different sets of stress differentiating material properties to each of the plurality of stress regions to form a stress-simulated green body part and predicting, by the computing system, the post-sintering geometry via a second sintering analysis of the stress-simulated green body part.

According to another embodiment, a method of predicting a post-sintering geometry of a green body part after sintering includes measuring stress differentiating material properties of a material configuration of the green body part while the material configuration is placed in a plurality of different stress states due to application of a load to the material configuration. The method also includes receiving, by a computing system, a geometry for a workpiece to be printed by a binder jet printing apparatus. The method also includes scaling, by the computing system, the geometry for the workpiece to generate a green body part geometry. The method also includes identifying, by the computing system, boundaries of a plurality of stress regions within the green body part geometry by performing a first finite element analysis on the green body part geometry The method also includes assigning, by the computing system, different sets of stress differentiating material properties to each of the plurality of stress regions to form a stress-simulated green body part. The method also includes predicting, by the computing system, the post-sintering geometry by performing a second finite element analysis on the stress-simulated green body part.

According to another embodiments, a system includes one or more processors, one or more non-transitory memory modules communicatively coupled to the one or more processors and storing machine-readable instructions that, when executed, cause the one or more processors to determine stress differentiating material properties of a material configuration of the green body part. The instructions also cause the processor to identify a plurality of stress regions in the green body part via a first sintering analysis of the green body part. Each stress region is associated with a portion of the green body part subjected to a particular stress state during the sintering. The instructions also cause the processor to assign different sets of stress differentiating material properties to each of the plurality of stress regions to form a stress-simulated green body part and predict the post-sintering geometry via a second sintering analysis of the stress-simulated green body part. The system also includes an additive manufacturing apparatus that receives the post-sintering geometry and prints a workpiece of the material configuration, the workpiece having a workpiece geometry that is based at least in part on the post-sintering geometry.

Additional features, advantages, and embodiments of the processes and systems described herein will be set forth in the detailed description which follows, and in part will be readily apparent to those skilled in the art from that such features, advantages, and embodiments are contemplated and considered within the scope of the disclosure, based on the teachings disclosed hereupon.

It is to be understood that both the foregoing general description and the following detailed description describe various embodiments and are intended to provide an overview or framework for understanding the nature and character of the subject matter claimed and described herein. The accompanying drawings are provided to facilitate a further understanding of the various embodiments, and are incorporated into and constitute a part of this specification. The drawings illustrate the various embodiments described herein, and together with the description serve to explain the principles and operations of the subject matter claimed and described herein.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
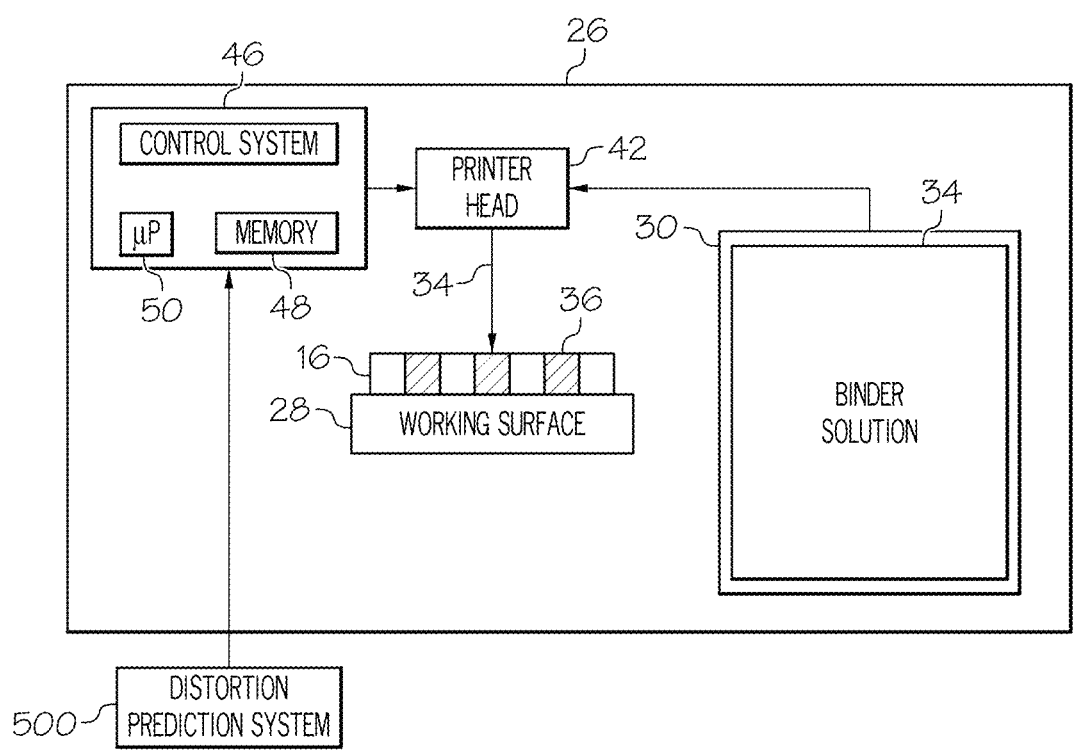
FIG. 1 schematically depicts an additive manufacturing apparatus including a distortion prediction system, according to one or more embodiments described herein.

Reference will now be made to various embodiments of predicting a post-sintering geometry of a green body part. The methods described herein include identifying stress differentiating material properties of the green body part. Depending on the geometry of the green body part, different portions or regions of the green body part are subjected to different stresses (e.g., tensile, compressive, shear, and the like) during sintering. Accordingly, the methods described herein include interrogating a stress distribution of the green body part in a first sintering analysis to identify a plurality of stress regions in the green body part, each stress region being associated with a different stress state. The stress regions may be determined based on different loads (e.g., frictional loads for regions of the green body part contacting a sintering support, gravitational loads for portions of the green body part, and the like) applied to different portions of the green body part depending on the green body part's geometry. Different sets of material properties including stress differentiating material properties may be assigned to each stress region to generate a stress-simulated green body part including a plurality of different stress regions, with each of the stress regions having different stress differentiating material properties than the other stress regions. The stress distribution of the stress-simulated green body part is interrogated in a second sintering analysis to predict the post-sintering geometry of the green body part.

Beneficially, the systems and methods described herein facilitate predicting post-sintering green body part geometries more accurately than existing methods by incorporating material property inhomogeneity resulting from different stress loads that different portions of the green body part are subjected to during sintering. Such predictions facilitate up-front prediction of part performance, reducing the need to print prototype parts for performance analysis. The systems and methods described herein may reduce the need for post-printing and sintering part redesign, rendering binder jet additive manufacturing more capable of producing larger parts having more complex geometries than previously possible. By utilizing the systems and methods described herein, parts may be pre-designed to incorporate distortion that results during sintering such that sintered parts possess a desired geometry.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" (or "substantially" or "approximately") is used in describing a value or an end-point of a range, the specific value or end-point referred to is comprised. Whether or not a numerical value or end-point of a range in the specification recites "about," two embodiments are described: one modified by "about," and one not modified by "about." It will be further understood that the endpoints of each of the ranges are significant both in relation to the other endpoint, and independently of the other endpoint. For example, the approximating language may refer to being within a 1, 2, 4, 10, 15, or 20 percent margin in either individual values, range(s) of values and/or endpoints defining range(s) of values.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, comprising: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" comprise plural referents unless the context clearly dictates otherwise. Thus, for example, reference to "a" component comprises aspects having two or more such components, unless the context clearly indicates otherwise.

The phrase "green body part," as used herein, refers to a printed workpiece that has not undergone heat treatment to remove a binder. Green body parts may include particulate material that has not been consolidated through heating to a sintering temperature of the particulate material. Green body parts consolidate during sintering when heated to a sufficient temperature to form post-sintering parts. As such, green body parts may have greater porosities (e.g., greater than or equal to 50% and less than or equal to 70%)) than post-sintering parts (e.g., greater than or equal to 92% and less than or equal to 98%).

The term "sintering," as used herein, refers to heating a green body part to one or more elevated temperatures. Sintering of the green body part may occur in multiple stages. For example, in embodiments, sintering may include heating the green body part to at least a first elevated temperature to induce thermal decomposition of at least a portion of a binder used to print the green body part. The green body part may then be heated above a second elevated temperature that is greater than the first elevated temperature to consolidate powder particles to form a post-sintering, consolidated part.

Referring now to FIG. 1, an additive manufacturing apparatus 26 that additively manufactures a green body part by binder jetting is schematically depicted. The additive manufacturing apparatus 26 includes a control system 46, a printer head 42, a binder reservoir 30, a binder solution 34, a working surface 28, and a distortion prediction system 500. In embodiments, the additive manufacturing apparatus 26 includes a powder supply (not depicted) and a recoater (not depicted) that coats a layer of powder material 16 onto the working surface 28. For example, the control system 46 may control the recoater and powder supply to provide the layer of powder material 16 onto the working surface 28. In embodiments, the layer of powder material 16 may have a thickness greater than or equal to 10 microns (μm) and less than or equal to 200 μm. The particulate material used to print the green body part may vary depending on the type of part and the end use of the part.

In embodiments, the layer of powder material 16 is made of a particulate material. The particulate material may include a metal particulate material, such as a nickel alloy (e.g., Inconel 625, Inconel 718, Rene'108, Rene'80, Rene'142, Rene'195, and Rene'M2, Marm-247), a cobalt alloy (e.g., Hans 188, L605, X40, X45, and FSX414), a cobalt-chromium alloy, a titanium alloy, an aluminum-based alloy, a tungsten alloy, a stainless steel alloy, or a combination thereof. In embodiments, the metal particulate material may comprise particles having a particle size distribution greater than or equal to 1 microns (μm) and less than or equal to 75 μm. Such particulate materials may be used to print metal articles including, by way of example and not limitation, fuel tips, fuel nozzles, shrouds, micro mixers, or turbine blades. In embodiments, the particulate material may include a ceramic particulate material, such as alumina, aluminum nitride, zirconia, titania, silica, silicon nitride, silicon carbide, boron nitride, or a combination thereof. In embodiments, the ceramic particulate material may comprise particles having a particle size distribution greater than or equal to 0.1 μm to less than and equal to 100 μm. Such particulate materials may be used to print ceramic articles for use in, by way of example and not limitation, the medical and transportation industries. It should be understood that the system and methods described herein may be used with a plurality of different particulate materials, depending on the implementation.

Referring still to FIG. 1, after depositing the layer of powder material 16 on the working surface 28, the control system 46 may control the printer head 42 to selectively deposit the binder solution 34 onto and into the layer of powder material 16 in a pattern that is representative of a layer of the green body part being printed. The control system 46 may include a distributed control system (DCS) or any computer-based workstation that is fully or partially automated. In embodiments, the control system 46 may be any suitable device employing a general purpose computer or an application-specific device, which may generally include memory circuitry 48 storing one or more instructions for controlling operation of the additive manufacturing apparatus 26. The memory circuitry 48 may store CAD models representative of a structure of the green body part being printed and/or the post-sintering part. The control system 46 may include one or more processing devices (e.g., microprocessor 50), and the memory circuitry 48 may include one or more tangible, non-transitory, machine-readable media collectively storing instructions executable by the microprocessor 50 to control actions described herein. The distortion prediction system 500 is communicatively coupled to the control system 46. In embodiments, the distortion prediction system 500 is incorporated into the control system 46. In embodiments, the distortion prediction system 500 is separate from the additive manufacturing apparatus 26 and communicates with the additive manufacturing apparatus 26 over a network. The distortion prediction system 500 performs the various operations described herein to predict sintering-induced distortion of green body parts printed via the additive manufacturing apparatus 26. The distortion prediction system 500 is described in greater detail herein with respect to FIG. 5.

In embodiments, a plurality of layers of powder material 16 are successively applied to the working surface 28, and the control system 46 selectively applies the binder solution 34 in a pattern on each of the layers of powder material 16. After such a process is performed to form an entirety of an intended structure of the green body part, the plurality of layers of powder material 16 may be heated to a curing temperature (e.g., greater than or equal to 25° C. and less than or equal to 100° C.) to evaporate at least a portion of a solvent in the binder solution 34. Heat may be applied to the printed part using an IR lamp and/or heated plate (e.g., on-machine), or may be carried out by placing the printed part in an oven (e.g., off-machine). Upon curing, the binder bonds the particulate material according to the pattern of the binder solution 34 printed into each layer of powder material 16 to form the green body part. Suitable binders include, but are not limited to, thermoplastic binders, thermoset binders, and non-polymeric binders such as waxes and sugars (e.g., glucose, fructose, derivatives thereof, or a combination thereof).

Figure 2:
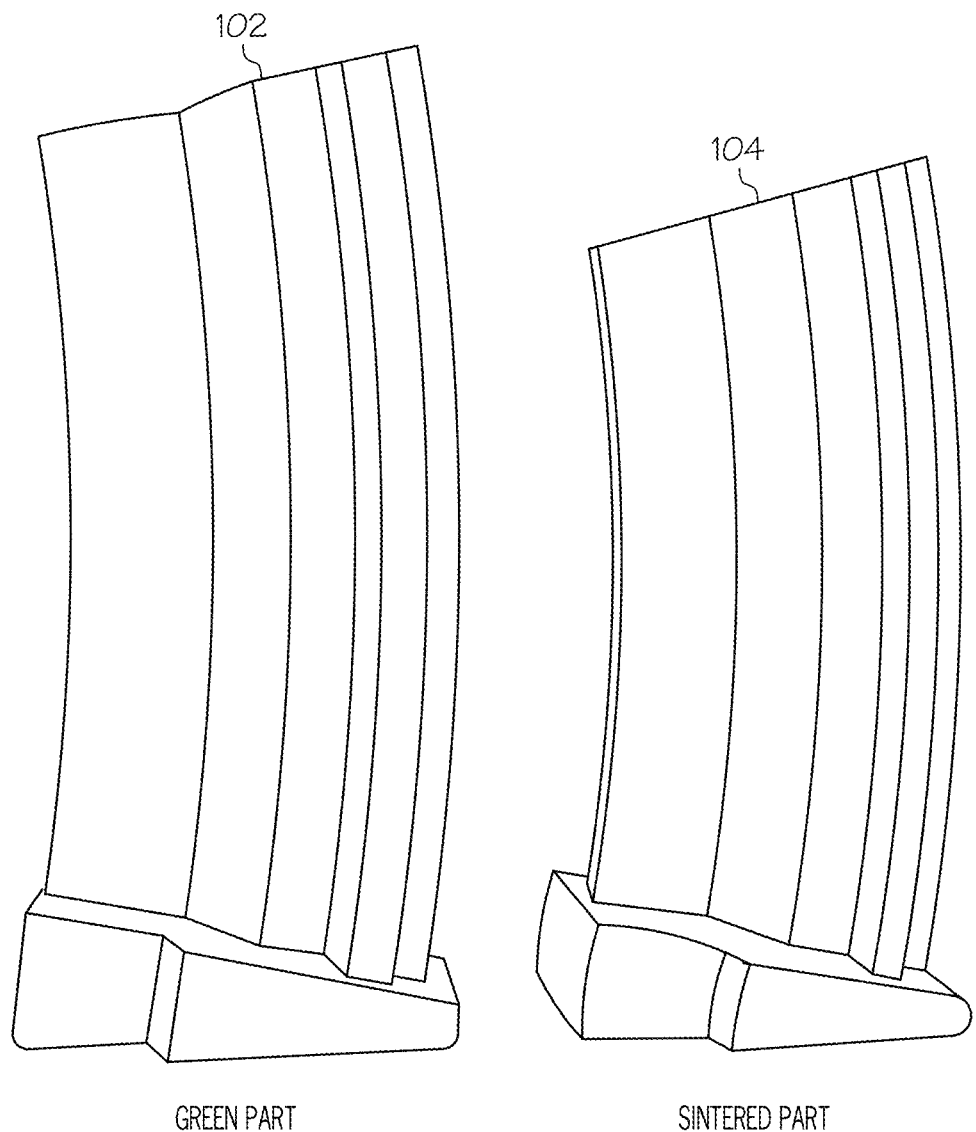
FIG. 2 depicts views of a green body part and a post-sintering part, according to one or more embodiments described herein.

Referring now to FIG. 2, upon formation of a green body part with the additive manufacturing apparatus 26, the green body part may be inserted into a sintering furnace (not depicted) for compaction of the green body part. FIG. 2 depicts a green body part 102 after production via the additive manufacturing apparatus 26. The green body part 102 may include 50 to 70% by volume of the particulate material used to form the layers of powder material 16 described herein with respect to FIG. 1. Another 1% to 2% of the volume of the green body part 102 may include cured binder solution (e.g., cured from the binder solution 34 described with respect to FIG. 1). A remainder of the volume of the green body part 102 may include porosity. As such, after production by the additive manufacturing apparatus 26, the green body part 102 may generally be approximately 50% dense to 70% dense. It should be understood that such densities may be after performance of post-printing processes (e.g., transferring, inspection, depowdering, and the like) of the green body part 102.

To density the green body part 102, the green body part 102 is transferred to a sintering furnace (not depicted) that heats the green body part to at least a first elevated temperature. In embodiments, sintering of the green body part 102 may occur in multiple stages. For example, in embodiments, sintering may include heating the green body part 102 to at least a first elevated temperature to induce thermal decomposition of at least a portion of a binder used to print the green body part 102 (e.g., to "debind" the green body part 102). The green body part 102 may then be heated above a second elevated temperature that is greater than the first elevated temperature to consolidate powder particles to form a post-sintering, consolidated part. The second elevated temperature may refer to as a sintering temperature at which to the particulate material used to form the layers of powder material 16 described with respect to FIG. 1 begins to consolidate the green body part 102 and compact the green body part into a post-sintering part 104. In embodiments, the second elevated temperature is greater than or equal to 300° C. (e.g., greater than or equal to 500° C., greater than or equal to 700° C., greater than or equal to 1000° C.). In embodiments, the post-sintering part possess a density that is greater than or equal to 92% (e.g., greater than or equal to 95% and less than or equal to 98%). That is, the post-sintering part 104 may have a porosity that is less than or equal to 5% by volume.

Consolidation of the particulate material used to form the green body part 102 compacts the particulate material leading to volumetric shrinkage of the green body part 102 during sintering. As depicted in FIG. 2, the post-sintering part 104 includes a volume that is scaled down from the green body part 102 as a result of the compaction. While the post-sintering part 104 is depicted to have the same geometry as the green body part 102, the volumetric shrinking of the green body part 102 occurring during the sintering may lead to distortion in the geometry of the green body part 102. For example, regions of the green body part 102 may shrink at different rates during sintering, resulting in different stress loads (e.g., tensile, compressive, strain) at different regions of the green body part 102. Such loads may result in distortion of the green body part 102 such that the post-sintering part 104 deviates in shape from the green body part 102. Additional loads (e.g., friction, gravitational loads, and the like) may also induce stress loads at different regions of the green body part 102 during sintering.

Figure 3:
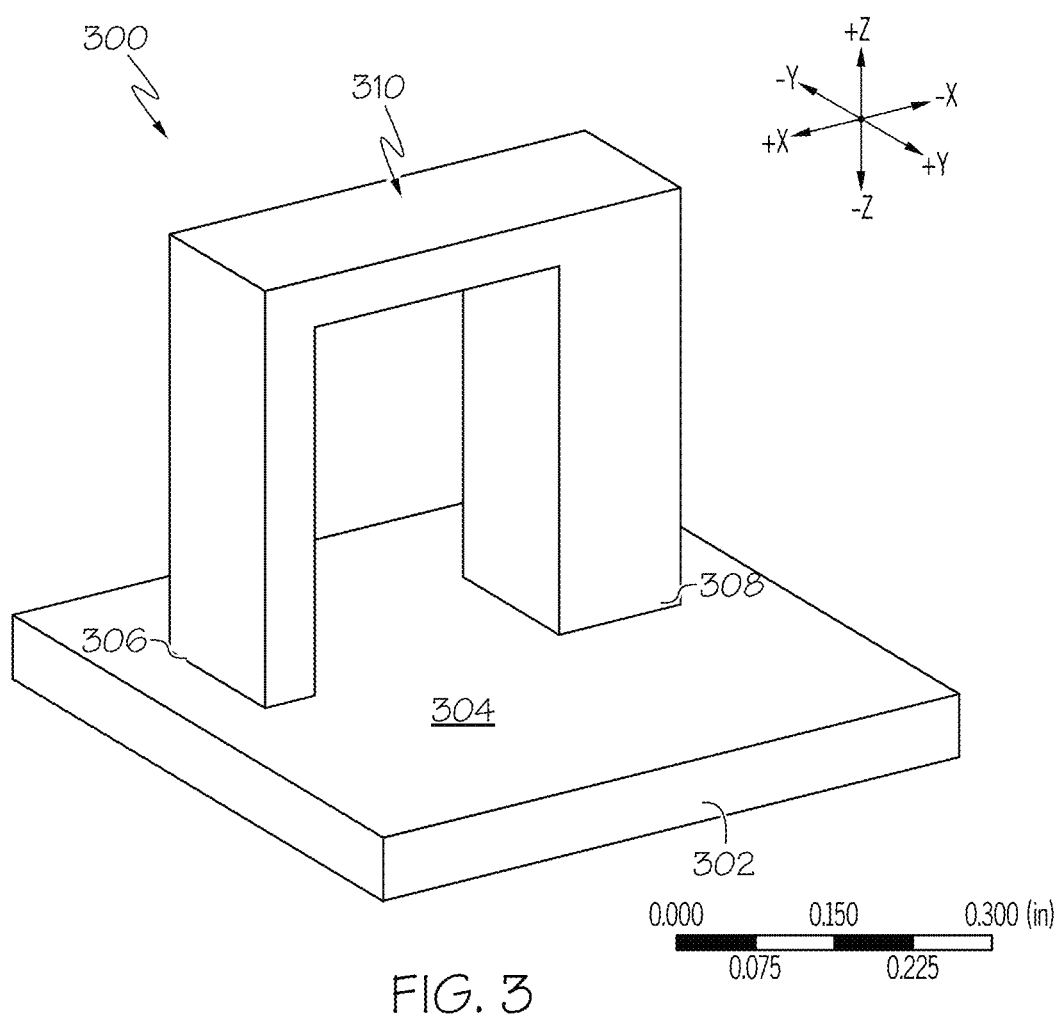
FIG. 3 schematically depicts a green body part disposed on a sintering support, according to one or more embodiments described herein.

Referring now to FIG. 3, a green body part 300 disposed on a sintering support 302 is shown. In embodiments, the green body part 300 has been printed via the additive manufacturing apparatus 26 described herein, depowdered, and transferred to a sintering furnace including the sintering support 302 for sintering. The green body part 300 is disposed on a support surface 304 of the sintering support 302. Contacting portions 306 and 308 of the green body part 300 are in direct contact with the sintering support 302 of the sintering furnace. Given the foregoing, as the green body part 300 shrinks during sintering, friction between the contacting portions 306 and 308 and the support surface 304 may cause the contacting portions 306 and 308 to shrink at a rate less than regions of the green body part 300 that do not contact the support surface 304, leading to stress loads in the green body part 300 and distortion of the post-sintering part derived from the green body part 300.

In the embodiment depicted in FIG. 3, the sintering support 302 is arranged such that the gravitational force is in a direction perpendicular to the support surface 304 (e.g., in the negative Z-direction). An unsupported portion 310 of the green body part 300 may be subjected to greater loads from the gravitational force than other regions of the green body part 300. That is, since the structure of the green body part 300 does not underlie the unsupported portion 310 (i.e., extend between the unsupported portion 310 and the support surface 304), gravitational loads may impart distortion on the unsupported portion 310. The magnitude of the gravitational loads that a specific point within the green body part 300 is subjected to may depend on the structural support provided by the remainder of the green body part 300 against the gravitational load. For example, regions in the center of the unsupported portion 310 may be distorted to a greater degree by the gravitational force than peripheral portions of the unsupported portion 310 that are closer to the contacting portions 306 and 308 in a direction perpendicular to the gravitational force (e.g., in the X-direction of the coordinate axes of FIG. 3). Such differing degrees of gravitational load may cause distortion in the green body part during sintering.

Figure 4:
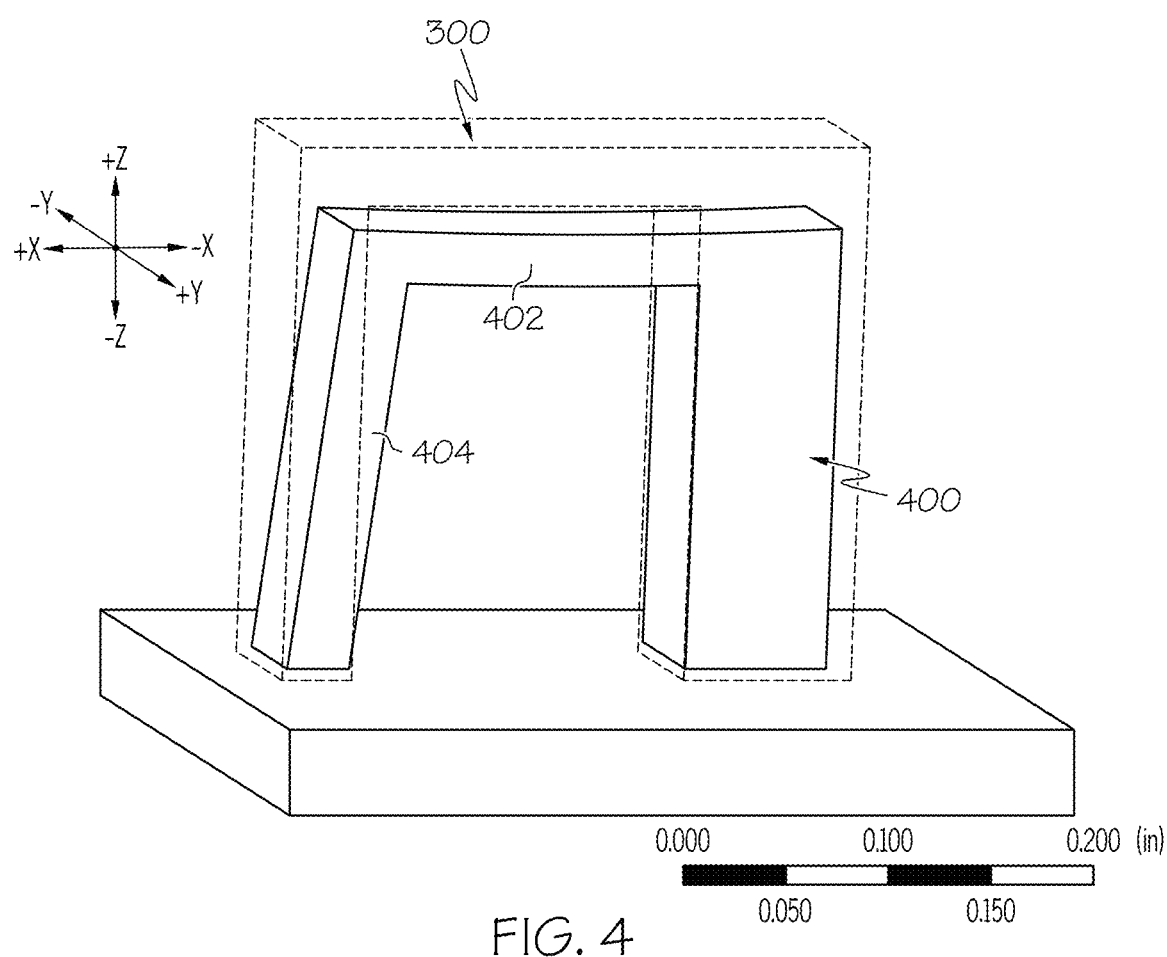
FIG. 4 depicts a distortion of a post-sintering green body part, according to one or more embodiments described herein.

Referring now to FIG. 4, a post-sintering part 400 derived from the green body part 300 described with respect to FIG. 3 is shown. For purposes of visualization, an outline of the green body part 300 is overlaid onto the post-sintering part 400. As depicted, not only does the post-sintering part 400 possess a reduced volume as compared to the green body part 300, but also deviates from the green body part 300 in terms of shape (e.g., proportions of components, relative direction of extension of the components, and the like). For example, the post-sintering part 400 includes an unsupported portion 402 corresponding to the unsupported portion 310 of the green body part 300 described herein. The unsupported portion 402 is distorted such that a central portion thereof is bent in the –Z direction due to gravitational loads during sintering. The post-sintering part 400 also includes a bent portion 404 that extends in a different direction (e.g., at an angle to) the corresponding portion of the green body part 300. Without wishing to be bound by theory, the bent portion 404 may result from frictional forces that the green body part 300 during sintering.

In order to provide a post-sintering part closely resembling a desired shape from a green body part printed by a binder jet printing apparatus, such as the additive manufacturing apparatus 26 described herein, the geometry of the green body part input the additive manufacturing apparatus 26 is based on a predicted distortion of the green body part induced by the sintering of the green body part. As such, the greater accuracy with which the distortion of the green body part is predicted, the greater conformity of the green body part to a desired geometry. Existing methods for distortion prediction may inaccurately predict distortion by improperly relying on the assumption of uniform material properties throughout the green body part. Existing methods may also suffer deficiencies that fail to account for various loads, such as friction and gravity that the green body part may be subjected to during sintering.

Figure 5:
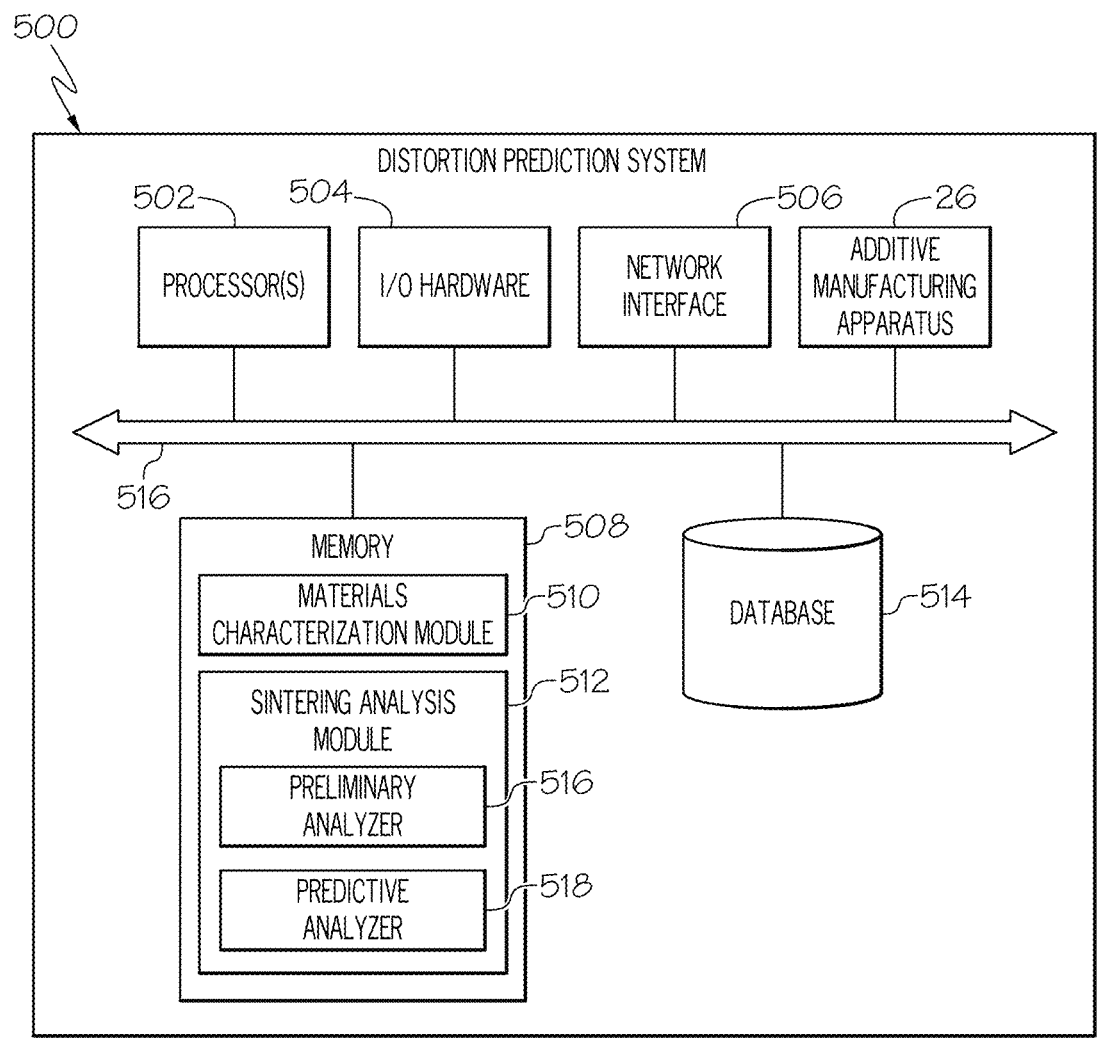
FIG. 5 schematically depicts the distortion prediction system of the additive manufacturing apparatus depicted in FIG. 1, according to one or more embodiments described herein.

In view of the foregoing, the distortion prediction system 500 may utilize a multi-step stress simulation technique that incorporates a plurality of loads (e.g., shrinkage, gravity, friction, and the like) that a green body part may be subjected to during sintering. The multi-step stress simulation is described in greater detail herein with respect to FIGS. 5 to 9E. With reference to FIG. 5, an example embodiment of a distortion prediction system 500 is schematically depicted. The distortion prediction system 500 is configured to predict a distortion of a green body part during sintering using the methods described herein. As shown, the distortion prediction system 500 includes a processor 502, input/output ("I/O") hardware 504, a network interface 506, a communications bus 506, a memory 508, and a database 514. In the shown example, the distortion prediction system 500 also includes the additive manufacturing apparatus 26 described with respect to FIG. 1. For example, in embodiments, the distortion prediction system 500 may be incorporated into the control system 46 described herein for predicting a distortion of a green body part based on a desired shape imported to the control system 46. For example, in embodiments, the distortion prediction system 500 may receive a CAD model representing a desired shape of a post-sintering part and predict distortion of a green body part derived from the CAD model. In embodiments, the distortion prediction system 500 does not include the additive manufacturing apparatus 26 and operates as a separate system. In embodiments, the distortion prediction system 500 may communicate a distortion prediction to the additive manufacturing apparatus 26 via the network interface 506.

While the distortion prediction system 500 is shown to include a single processor 502, it should be appreciated that the distortion prediction system 500 may include any number of processors depending on the implementation. The processor 502 can include any suitable processing device, such as a microprocessor, microcontroller, integrated circuit, logic device, and/or other suitable processing device. In embodiments, the processor 502 is a processing circuit (e.g., either a single processing circuit or a group processing circuit) that executes some or all of the machine-readable instructions from multiple modules of one or more non-transitory computer-readable mediums (e.g., the memory 508).

I/O hardware 504 may include at least one element to receive inputs from a user and/or provide results of the computations performed via the distortion prediction system 500 to a user. For example, in embodiments, the I/O hardware 504 may include a basic input/output system (BIOS) that interacts with hardware of the distortion prediction system 500, device drivers that interact with particular devices of the distortion prediction system 500, one or more operating systems, user applications, background services, background applications, and the like. The network interface 506 can include any suitable components for interfacing with one or more network(s), including for example, transmitters, receivers, ports, controllers, antennas, and/or other suitable components. The network interface 506 may include and/or be configured to communicate with any wired or wireless networking hardware, including an antenna, a modem, a LAN port, a wireless fidelity (Wi-Fi) card, a WiMax® card, a long term evolution (LTE®) card, a ZigBee® card, a Bluetooth® chip, a USB™ card, mobile communications hardware, and/or other hardware for communicating with other networks and/or devices. The network interface 506 allows the distortion prediction system 500 to communicate with external computing systems. The database 514 may generally comprise a data storage component communicably coupled to the processor 502 via the communication bus 506. As a non-limiting example, the database 514 may include one or more database servers that support NoSQL, MySQL®, Oracle®, SQL Server®, NewSQL, and/or the like.

The memory 508 is communicatively coupled to the processor 502. As a non-limiting example, the memory 508 may comprise one or more non-transitory computer-readable medium that may be one of a shared memory circuit, dedicated memory circuit, or group memory circuit. Non-limiting examples of the memory include random access memory (including SRAM, DRAM, and/or other types of random access memory), read-only memory (ROM), flash memory, registers, compact discs (CD), digital versatile discs (DVD), and/or other types of storage components. Memory 508 may store instructions accessible to the processor 502 via an addressing scheme such that the processor 502 may access the memory 508 to execute the instructions in accordance with a program to perform any of the functions and operations described herein.

The memory 508 is shown to include a materials characterization module 510 and a sintering analysis module 512. The materials characterization module 510 is configured to identify stress differentiating material properties for green body parts produced via binder jet printing (e.g., via the additive manufacturing apparatus 26 described herein). In embodiments, the materials characterization module 510 receives (e.g., via the network interface 506) material properties of material used in the formation of a green body part (e.g., the particulate material used to form the layers of powder material 16 described with respect to FIG. 1). The material properties may characterize aspects (e.g., elastic modulus—such as a Young's modulus, a shear modulus, and a bulk modulus—Poisson's ratio, density, tensile strength, yield strength, hardening modulus) of a plurality of workpieces constructed of a material, with each workpiece being under an initial stress state (e.g., compressive, tensile, shear).

In embodiments, the materials characterization module 510 may guide a user through a materials calibration process in order to generate materials property data describing materials in different stress states. An example of such a materials calibration process is described herein with respect to FIG. 6. The materials characterization module may include a plurality of testing green part models that may be provided to the additive manufacturing apparatus 26. Each green part testing model may include a portion specifically designed to undergo a certain stress state during sintering. After the green part testing model is printed via the additive manufacturing apparatus 26, the printed green part testing model is subjected to sintering. Material properties of the portion of the green part testing model designed to undergo the certain test state are then measured and the results (e.g., via the I/O hardware 504) are input to the distortion prediction system 500.

Irrespective of the manner with which the materials property information is obtained (e.g., whether through importation from an external source or input upon measurement), the materials characterization module 510 is configured to identify stress differentiating material properties for a given material configuration. The material configuration may be based on materials used in printing a green body part by the additive manufacturing apparatus 26. For example, a particular material configuration may be based on a particulate material used to form the layers of powder material 16, the particular binder solution 34 used to bind the particulate material, or a combination of the binder solution 34 and particulate material. A material property described by the material property information may be a stress differentiating material property if the material property takes a first value for a workpiece having a material configuration in a first stress state (e.g., a tensile stress state) and second value for a workpiece having the material configuration in a second stress state (e.g., a compressive stress state), and if the first value differs from the second value by more than a predetermined threshold (e.g., 1%, 2%, 5%, 10%, 20%, etc.). In an example, if a first workpiece of a material configuration is measured to have a first Young's modulus in a compressive state and a second workpiece of the material configuration is measured to have a second Young's modulus in a tensile state that differs from the first Young's modulus by more than 10%, the Young's modulus of that material configuration (e.g., combination of particulate material and binder solution 34) may be a stress differentiating material property.

Referring still to FIG. 5, the sintering analysis module 512 is configured to estimate a deformation and stress load of a green body part during sintering. In embodiments, the sintering analysis module 512 includes a finite element analysis framework for calculating distortion of a green body part geometry under specified loading and boundary conditions of a sintering process. In embodiments, the finite element analysis framework employs a steady state analysis (e.g., where material properties of the green body part are held constant) or a time-depending analysis (where material properties of the green body parts vary during sintering). In embodiments, the finite element analysis framework assumes that the green body part has linear material properties. In embodiments, the finite element analysis framework assumes that the green body part has non-linear material properties. Loading conditions used by the sintering analysis module 512 in performing the finite element analysis may include all of the external forces that the green body part is subjected to during sintering (e.g., friction, gravity, etc.). Boundary conditions may include displacement constraints on the green body part during sintering, determined, for example, by the support for the green body part during sintering (e.g., the support surface 304 described with respect to FIG. 3).

The sintering analysis module 512 is depicted to include a preliminary analyzer 516 and a predictive analyzer 518. The preliminary analyzer 516 performs a first finite element analysis on a green part body geometry to identify regions of the green body part that are subjected to particular stress states during the sintering. As described herein, stress differentiating material property sets are then assigned to each of the stress regions identified by the preliminary analyzer 516 create a stress-simulated green body part. The predictive analyzer 518 performs a second finite element analysis on the stress-simulated green body part to predict a distorted shape of a post-sintering part. In embodiments, the preliminary analyzer 516 and the predictive analyzer 518 utilize the same finite element analysis boundary conditions, but with different loading conditions. For example, in embodiments, the loading conditions (e.g., specifying gravity force, friction force, and densification factor for the green body part during sintering) used by the preliminary analyzer 516 are scaled versions of the loading conditions used by the predictive analyzer 518. For example, each load parameter may be scaled by an independent load scaling factor and used to run the first finite element analysis performed by the preliminary analyzer 516. In embodiments, the preliminary analyzer 516 utilizes different material properties for the green body part than the predictive analyzer 518. For example, in embodiments, the preliminary analyzer 516 assumes that the green body part possesses uniform material properties (e.g., linear or non-linear) in performing the first finite element analysis. The preliminary analyzer 516 utilizing scaled loading factors and uniform material properties beneficially increases processing times to perform the first finite element analysis, reducing overall computational cost. In embodiments, the preliminary analyzer 516 and the predictive analyzer 518 may perform different types of finite element analyses. For example, in embodiments, the preliminary analyzer 516 may utilize a non-linear static material property framework while the predictive analyzer 518 utilizes a linear static material property framework. In another example, the preliminary analyzer 516 may utilize a time dependent material property framework while the predictive analyzer 518 may utilize a static material property framework. Various combinations of finite element analysis frameworks are possible.

Figure 6:
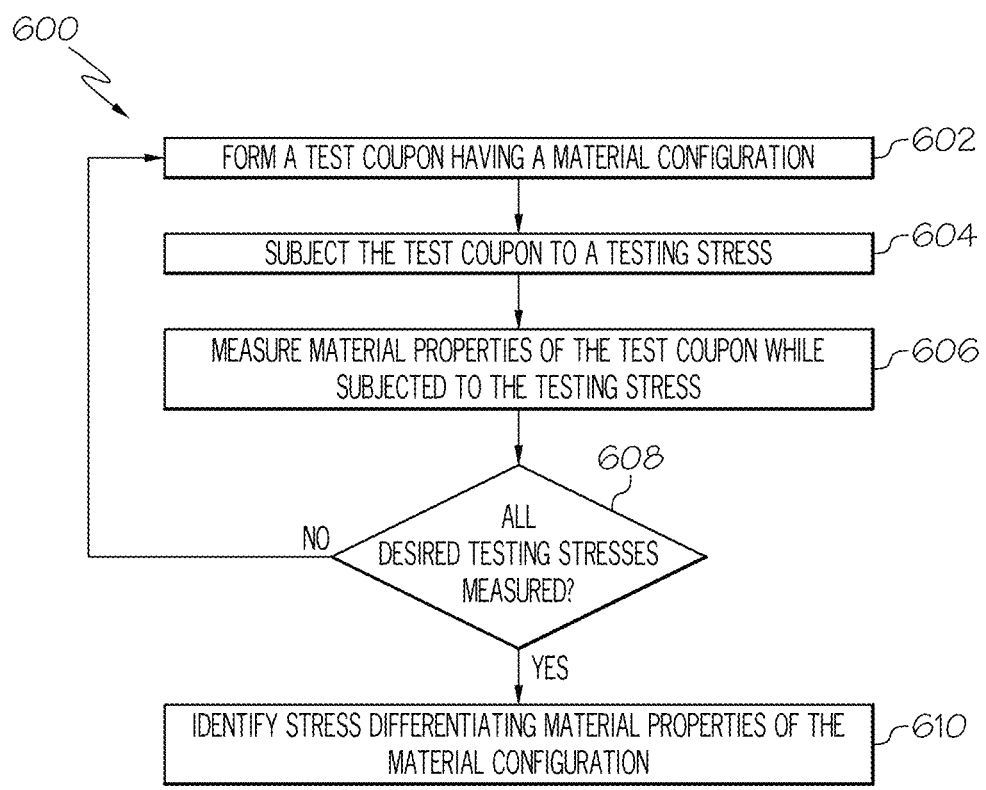
FIG. 6 depicts a flow diagram of a method of identifying stress differentiating material properties of a material configuration for a green body part, according to one or more embodiments described herein.

Referring now to FIG. 6, a flow diagram of a method 600 for identifying stress differentiating material properties of a material configuration for an additive manufacturing apparatus is shown. The method 600 may be performed using the distortion prediction system 500 described herein (e.g., via the materials characterization module 510 and processor 502) to generate material property information for predicting distortion of a green body part during sintering. It should be understood that the method 600 is exemplary only and alternative methods for identifying stress differentiating material properties are contemplated and are consistent with the present disclosure.

At block 602, a test coupon having a material configuration is formed. In embodiments, the test coupon is formed via the additive manufacturing apparatus 26 described herein with respect to FIG. 1. For example, as described herein, the materials characterization module 510 of the distortion prediction system 500 may include a plurality of testing green part models that may be input (e.g., as part models) to the additive manufacturing apparatus 26 for printing test coupons. In embodiments, a user of the distortion prediction system 500 may input a testing green part model to the additive manufacturing apparatus 26. In embodiments, a testing green part model used by the additive manufacturing apparatus 26 is received from an external computing system over a network. In embodiments, the method 600 may not include the block 602 and the test coupons may be provided to a user of the distortion prediction system 500.

The material configuration of the test coupon may be associated with a plurality of print process parameters (e.g., particulate material, binder solution, scanning speed, curing parameters, and the like) that may be used by the additive manufacturing apparatus 26 to print workpieces. In embodiments, the method 600 may be repeated a plurality of different times for a plurality of different material configurations (e.g., using different combinations of particulate material, binder solution, processing speeds, and the like) that may be used by the additive manufacturing apparatus 26 to produce workpieces. This way, the materials characterization module 510 includes material property information for simulating the distortion of workpieces constructed using a plurality of different material configurations.

Figure 7A:
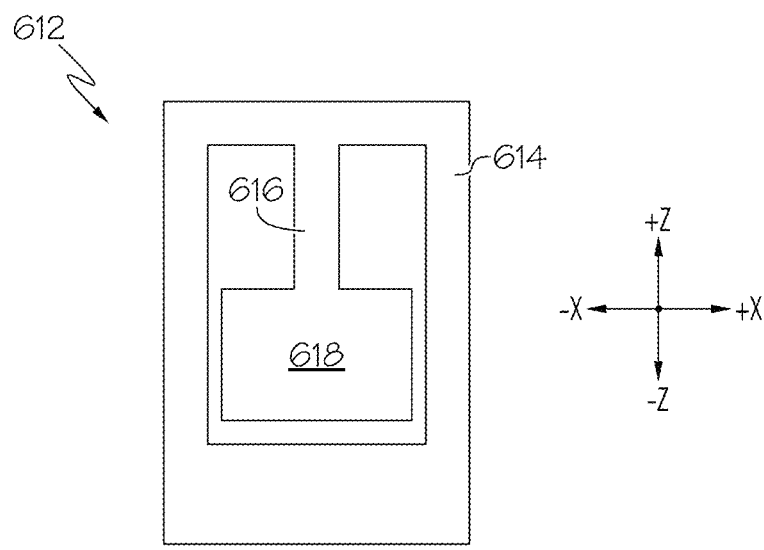
FIG. 7A schematically depicts a test coupon for measuring material properties of a material configuration of a green body part, according to one or more embodiments described herein.
Figure 7B:
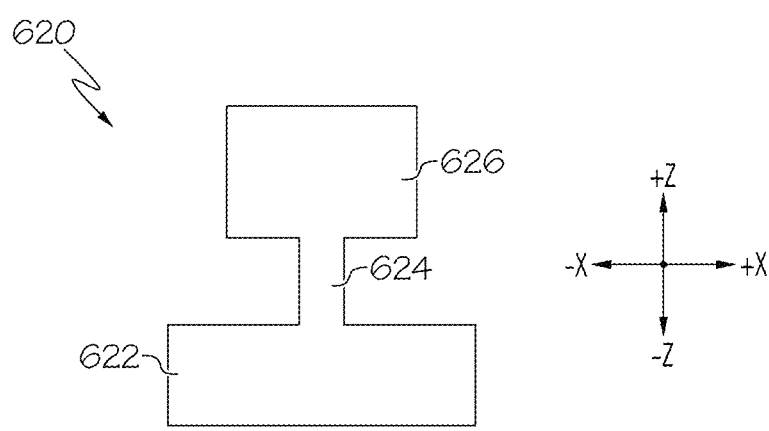
FIG. 7B schematically depicts a test coupon for measuring material properties of a material configuration of a green body part, according to one or more embodiments described herein.
Figure 7C:
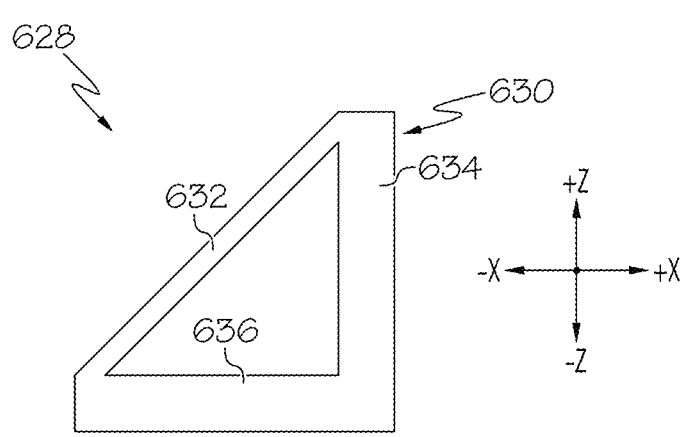
FIG. 7C schematically depicts a test coupon for measuring material properties of a material configuration of a green body part, according to one or more embodiments described herein.

FIGS. 7A, 7B, and 7C schematically depict example test coupons that may be formed pursuant to the method 600. FIG. 7A schematically depicts a first test coupon 612 for testing a material configuration in a tensile load state. FIG. 7B schematically depicts a second test coupon 620 for testing a material configuration in a compressive load state.

FIG. 7C schematically depicts a third test coupon 628 for testing a material configuration in a strain load state. That is, the first, second, and third test coupons 612, 620, and 628 are each constructed to test material properties of a material configuration in a different stress state.

Referring to FIG. 7A, the first test coupon 612 includes a support portion 614, a stress portion 616, and a loading portion 618. The support portion 614 supports the stress portion 616 and the loading portion 618 in a desired orientation relative to an external force such that the stress portion 616 is placed in a desired stress state upon sintering. In the depicted embodiment, the external force is gravity and the support portion 614 is a support frame from which the stress portion 616 extends in the negative Z direction. The loading portion 618 is attached to an end of the stress portion 616 and subjects the stress portion 616 to a gravitational load during sintering. The loading portion 618 supplies a downward force to the end of the stress portion 616 attached thereto, while the support portion 614 prevents downward motion of an opposing end of the stress portion 616. Given this, a central region of the stress portion 616 is subjected to two loads in opposing directions (i.e., the gravitational load from the loading portion 618 in the negative Z-direction and the structural support from the support portion 614 in the positive Z-direction) such that the stress portion 616 is placed under a tensile stress.

Referring now to FIG. 7B, the second test coupon 620 includes a support portion 622, a stress portion 624, and a loading portion 626. The support portion 622 supports the stress portion 624 and the loading portion 626 in a desired orientation relative to an external force such that the stress portion 624 is placed in a desired stress state upon sintering. In the depicted embodiment, the external force is gravity and the support portion 622 supports the stress portion 624 and the loading portion 626 such that the loading portion 626 applies a force in the negative Z-direction of the coordinate axes of FIG. 7B to the stress portion 624. As depicted, the loading portion 626 is disposed at an upper end of the stress portion 624, while the support portion 622 supports a lower end of the stress portion 624. The loading portion 626 is larger than the stress portion 624 such that the loading portion 626 applies a downward gravitational force on the upper end of the stress portion 624. The support portion 622 supplies an upward normal force to a lower end of the stress portion 624 such that each end of the stress portion 624 is forced towards the other to place a central region of the stress portion 624 in a compressive state.

Referring now to FIG. 7C, the third test coupon 628 includes a support portion 630 and a stress portion 632. The support portion 630 is an L-shaped support frame in the depicted embodiment, though other forms for the support portion 630 are contemplated and within the scope of the present disclosure. The support portion 630 supports both ends of the stress portion 632. In the depicted embodiment, a first support arm 634 of the support portion 630 supports a first end of the stress portion 632 and a second support arm 636 of the support portion 630 supports a second end of the stress portion 632. The first and second support arms 634 and 636 extend in different directions (e.g., perpendicular to one another). As such, volumetric shrinkage of the first and second support arms 634 and 636 during sintering results in each end of the stress portion 632 being forced in a different direction, placing a central region of the stress portion 632 under a strain state.

While the first, second, and third test coupons 612, 620, and 628 are described herein as being formed by the additive manufacturing apparatus 26, it should be understood that the first, second, and third test coupons 612, 620, and 628 may be formed by alternative mechanisms consistent with the present disclosure. Moreover, it should be understood that alternative structures of test coupons may be formed if external forces other than gravity are used to place stress portions of the test coupons under a desired stress state. Additionally, while the test coupons are described herein as being placed in desired stress states by sintering the test coupons, alternative means of placing the material configurations of the test coupons in different stress states are envisioned. For example, a sintered green body part may be subjected to external forces in any manner as a part of identifying stress differentiating material properties for that material configuration. Moreover, it should be appreciated that test coupons may be formed to construct not only the dependency of materials on the type of stress applied to the material configuration, but also to the magnitude of stress. For example, the first test coupon 612 may be modified to enlarge the loading portion 618 to determine if any material properties significantly deviate as a function of magnitude of tensile stress.

Referring again to FIG. 6, after the formation of a test coupon, the test coupon is subjected to a testing stress at block 604. In embodiments, the test coupon is subjected to sintering in a sintering furnace in order to place a portion of the test coupon into a desired stress state. For example, the first test coupon 612 described with respect to 7A may be placed into a sintering furnace, heated to an elevated temperature, and maintained at the elevated temperature for a predetermined sintering period. During the sintering, the gravitational load imparted on the stress portion 616 via the loading portion 618 places the stress portion in a tensile state. In embodiments, a test coupon may be sintered and sequentially subjected to an external load other than gravity (e.g., via an actuator) to place a portion of the test coupon under a testing stress.

At block 606, material properties of the of test coupon are measured while the test coupon is subjected to the testing stress. For example, the testing stress may be present in the sintered test coupon due to external loads such as gravity or friction. As such, material properties of the portion of the test coupon under the testing stress may be measured using known techniques. As described herein, material properties that may be measured include, but are not limited to Young's modulus, shear modulus, bulk modulus, Poisson's ratio, density, tensile strength, yield strength, and hardening modulus. To measure the Young's modulus, for example, the portion of the test coupon under the testing stress may be subjected to a predetermined force and a change in the dimensions of the portion of the test coupon may be measured. In another example, a plurality dimensional measurements may be taken while subjecting the portion of the test coupon to an additional force to measure a Poisson's ratio of the material configuration under the testing stress. In embodiments, a user of the distortion prediction system 500 may manually perform such measurements and input the results to the distortion prediction system 500 for analysis via the materials characterization module 510.

At block 608, a decision is made as to whether material properties of a material configuration have been measured for a desired set of testing stresses. For example, in embodiments, the testing stresses desired to be measured may depend on a number of stress states to be incorporated in a simulation model of a green body part for which distortion is being predicted. In embodiments, the testing stresses desired to be measured may be fixed, and include a predetermined set of testing stresses (e.g., a tensile stress state, a compressive stress state, and a strain state). If material properties have not been obtained for all of the desired stress states, the method 600 may revert back to the block 602 and an additional test coupon may be formed (e.g., the additive manufacturing apparatus 26 may print an additional test coupon), which is subjected to an additional testing stress and measured.

After material properties for the material configuration have been measured for all of the desired testing stresses, the stress differentiating material properties of the material configuration are identified at block 610. In embodiments, the distortion prediction system 500 (e.g., via the materials characterization module 510) compares the material properties measured for the material configuration in each of the testing stress states to identify stress differentiating material properties for the material configuration. In embodiments, to identify a particular material property as a stress differentiating material property, the distortion prediction system 500 determines whether at least two of the values for that material property (i.e., measured in the respective different testing stress states) differ from one another by more than a threshold. The threshold may be based on a percentage difference between the values for the material property. For example, in embodiments, the distortion prediction system 500 identifies a particular material property as a stress differentiating material property when at least two of the values (e.g., a first value measured for the material configuration in a compressive stress state and a second value measured for the material configuration in a tensile stress state) for that material property differ from one another by greater than or equal to 5% of the lesser of the two values (e.g., greater than or equal 10%). Alternatively or additionally, the threshold may be fixed for a particular material property and not be computed as a percentage. In embodiments, a particular material property may be identified as a stress differentiating material if each measured value for that material property differs from each of the other measured values by more than a threshold. For example, in such embodiments, if there are three Young's modulus measurements (e.g., corresponding to a material configuration in a tensile stress state, a compressive stress state, and a strain state), the distortion prediction system 500 may identify the Young's modulus as a stress differentiating material property if each of these three Young's modulus measurement differs from both of the other Young's modulus values by more than a threshold (e.g., as a percentage, such as by greater than or equal to 5% or greater than or equal to 10%).

The method 600 may be repeated any number of times to characterize any number of material configurations through which green body parts may be produced by the additive manufacturing apparatus 26. Via performance of the method 600, the distortion prediction system 500 may identify sets of stress differentiating material properties for a particular material configuration that may be assigned to regions of a green body part for simulating the distortion of that green body part resulting from sintering, as described herein.

Figure 8:
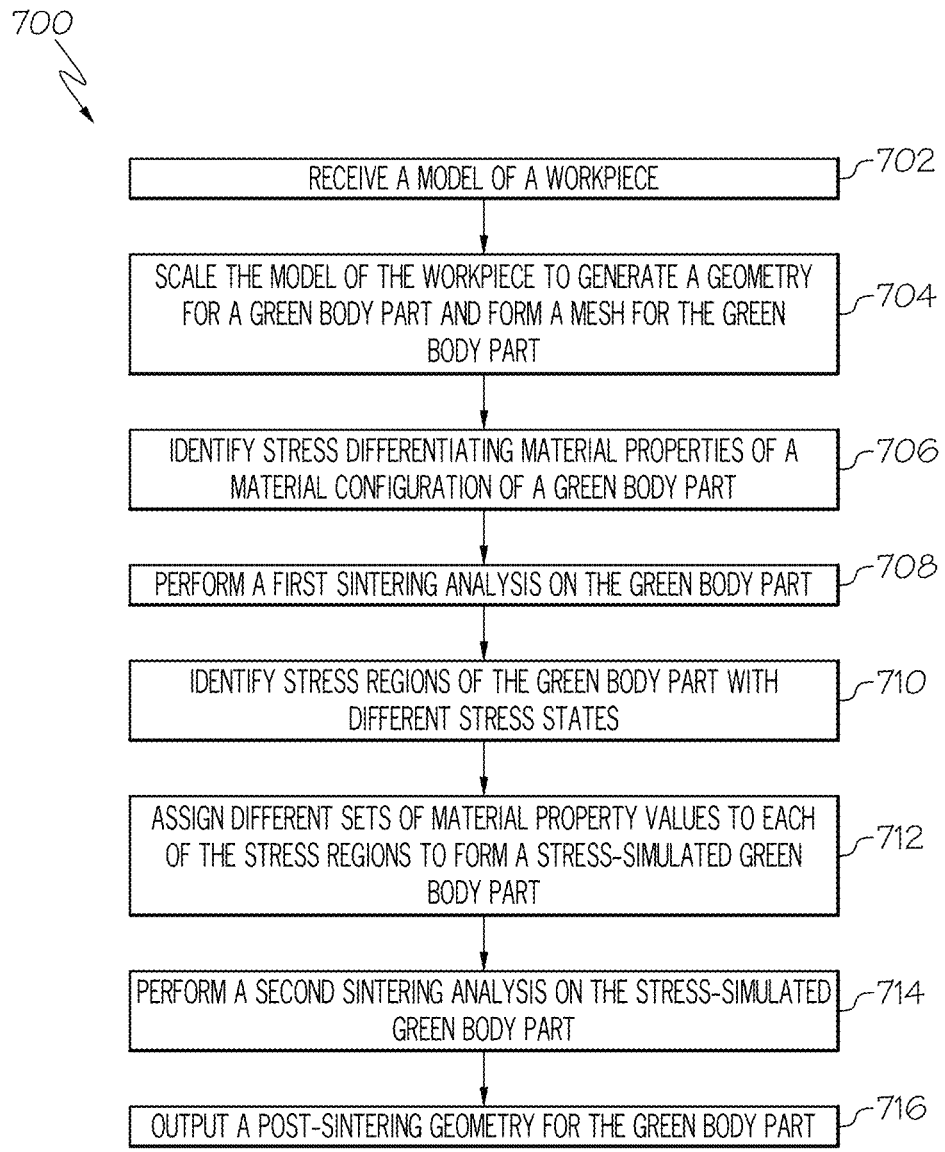
FIG. 8 depicts a flow diagram of a method of predicting a post-sintering geometry of a green body part, according to one or more embodiments described herein.

FIG. 8 depicts a flow diagram of a method 700 providing a post-sintering geometry of a green body part. The method 700 may be performed by distortion prediction system 500 described herein (e.g., via the sintering analysis module 512) to predict a distortion of a green body part having a particular material configuration. The distortion predictions generated via performance of the method 700 may be used in adjusting a geometry of the green body part until the predicted post-sintering geometry of the green body part substantially matches a desired shape of a workpiece.

At block 702, a model of a workpiece is received by the distortion prediction system 500. For example, the model input by a user of the distortion prediction system 500 or received from an external computing system via a network. In embodiments, the model corresponds to a part geometry input to the additive manufacturing apparatus 26. The model may define a geometry for the workpiece and design tolerances associated with the part. For example, the model may include a CAD model that may be input to the additive manufacturing apparatus 26 described herein to form a green body part.

At block 704, the model of the workpiece is scaled to generate a geometry for a green body part and a mesh is formed for the green body part. As described herein, during sintering, a green body part is generally subjected to volumetric shrinkage due to melting and fusing of particulate material. Thus, in order for a post-sintering part to have a geometry that corresponds to the model, a green body part subjected to sintering may be expanded based on an amount that the material configuration of the green body part may shrink during the sintering. In embodiments, the sintering analysis module 512 includes a plurality of sets of green scale factors associated with a plurality of different material configurations. Each set of green scale factors may specify an amount that a green part having the material configuration may shrink in a particular direction (e.g., the X-direction, Y-direction, and the Z-direction) during sintering. Each set of scaling factors may also be associated with a particular sintering profile (e.g., sintering duration, sintering temperature, and the like). Accordingly, a set of scaling factors may be selected based on the material configuration of the green body part and the sintering profile to be used to sinter the green body part. The model of the workpiece is expanded in three dimensions according to the set of green scaling factor to form a green body part model.

Figure 9A:
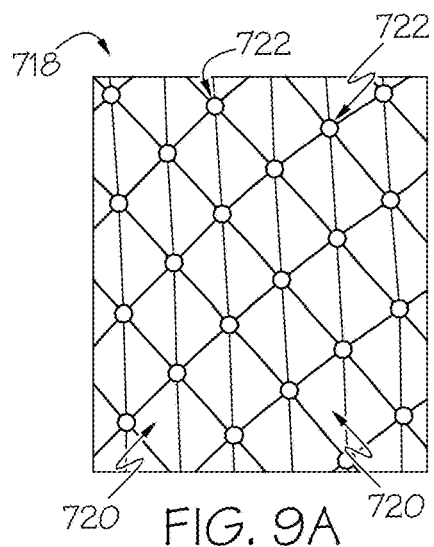
FIG. 9A schematically depicts a mesh for performing a sintering analysis, according to one or more embodiments described herein.

To facilitate distortion prediction, the green body part model may be discretized into a mesh. FIG. 9A depicts an exemplary mesh 718 that may be applied to the green body part model. The mesh 718 includes a plurality of elements 720 that are discrete solids that are populated with the material configuration of the green body part to make up the full green body part model. Each of the elements 720 represents the smallest discrete region of the green body part model subjected to the sintering analysis described herein. Depending on the implementation, the elements 720 may be shaped differently. For example, in the depicted embodiment, each of the elements is represented by a triangular shape, through differently shaped elements (e.g., tetrahedral elements, parallelepiped elements, etc.) are contemplated and within the scope of the present disclosure. The mesh 718 includes a plurality of nodes 722 representing corners and/or central points of each of the plurality of elements 720. FIG. 9A depicts only a portion of the mesh 718, and the pattern depicted in FIG. 9A may be overlaid any number of times onto the green body part model such that an entirety of the green body part model is discretized via the mesh 718. Any suitable meshing process may be used to discretize the green body part model in accordance with the present disclosure.

At block 706, the distortion prediction system 500 identifies stress differentiating material properties of the material configuration of the green body part. For example, the distortion prediction system 500 may perform the method 600 described herein with respect to FIG. 6 to identify stress differentiating material properties for the green body part. The stress differentiating material properties may include a plurality of sets of material properties identified to differ from one another depending on the stress state that the material configuration of the green body part is placed. For example, a first set of stress differentiating material properties may include a first Young's modulus value and a first Poisson's ratio value for the material configuration in a tensile stress state, a second Young's modulus value and a second Poisson's ratio value for the material configuration in a compressive stress state, and a third Young's modulus value and a third Poisson's ratio value for the material configuration in a strain state. The values for each material property in the sets of stress differentiating material properties may each differ from one another by more than a threshold.

At block 708, a first sintering analysis is performed for the green body part. In embodiments, the first sintering analysis is performed via the preliminary analyzer 516. As described herein, the preliminary analyzer 516 may utilize a first finite element analysis framework using first sets of loading and boundary conditions. In embodiments, the first set of loading conditions may include scaled versions of loads that the green body part may be subjected to during sintering. For example, based on measurements of the material configuration previously subjected to a sintering profile, loads may be estimated for various portions of the green body part (e.g., gravitational, frictional, and shrinkage loads, and the like). The magnitudes of such loads may be scaled for the first sintering analysis. To illustrate, the first finite element analysis may utilize a scaled gravitational load, a scaled frictional load, and a scaled shrinkage load (e.g., densification factor). Each of the loads estimated to be present during the sintering may be scaled by a load scaling factor (e.g., 0.0001, 0.001, 0.01, 0.1, 0.5, etc.) for performing the first sintering analysis. In embodiments, each of the loads is scaled by the same scaling factor. In embodiments, at least one of the loads is scaled by a different scaling factor than the other loads, depending on the magnitude of each load. The scaling of the loads beneficially prevents the first sintering analysis from estimating failure of the green body part during sintering and eliminates additional process runs, thereby improving computational efficiency. It should be understood that embodiments where the first loading conditions are not scaled are also contemplated and within the scope of the present disclosure.

Figure 9B:
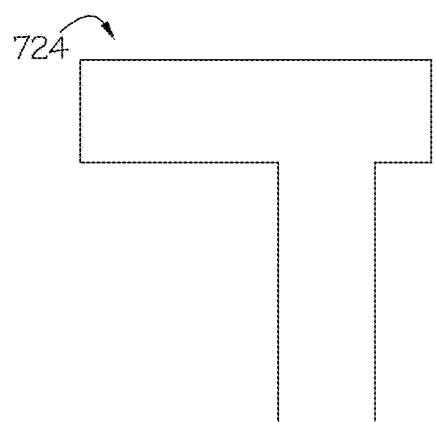
FIG. 9B schematically depicts a green body part, according to one or more embodiments described herein.

FIG. 9B depicts an example green body part 724 that may be subjected to the first sintering analysis. The green body part 724 is depicted to possess a uniform material composition. In embodiments, the green body part 724 is discretized using the mesh 718 described with respect to 9A to perform the first sintering analysis. In embodiments, the first finite element analysis may assume that the green body part 724 has linear elastic material properties (e.g., stiffness and Poisson's ratio). In embodiments, the first finite element analysis may assume that the green body part has non-linear elastic material properties. In embodiments, the values for the material properties used in the first finite element analysis are determined based on results of sintering green body parts having similar material configurations. The first sintering analysis performed via the preliminary analyzer 516 may predict displacement of each of the nodes 722 of the mesh 718 of the green body part 724 based on the scaled loading conditions. The use of uniform material properties for the green body part 724 beneficially expedites the analysis, though use of non-uniform material properties during the first sintering analysis is contemplated and within the scope of the present disclosure.

Referring again to FIG. 8, after performing the first sintering analysis, stress regions of the green body part are identified at block 710. Based on the predicted displacement of the nodes 722 from the first sintering analysis, subsets of the elements 720 of the green body part 724 may be predicted to be subjected to distinct stress states as a result of the sintering. For example, elements 720 between nodes 722 predicted to move towards each other may be subjected to a compressive stress, while elements 720 between nodes depicted to move further from one another may be subjected to a tensile stress. In embodiments, each element 720 is classified based on both the predicted stress state that that element 720 is subjected to an the magnitude of the stress (e.g., based on the magnitude of the predicted displacement of the nodes 722). The results of such classifications may be overlaid onto the green body part to identify the stress regions.

Figure 9C:
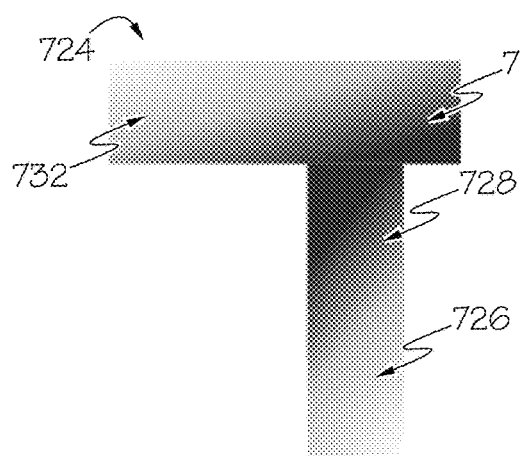
FIG. 9C schematically depicts a plurality of stress regions of a green body part, according to one or more embodiments described herein.

FIG. 9C depicts the results of the classifications from the first sintering analysis on the green body part 724 described with respect to FIG. 9B. The first sintering analysis reveals that the green body part 724 has a first stress region 726, a second stress region 728, a third stress region 730, and a fourth stress region 732. The first, second, third, and fourth stress regions 726, 728, 730, and 732 may be distinct from one another, in at least one of the type of primary stress predicted to be present therein and the magnitude of the primary stress differs from that of the regions adjacent thereto. For example, without wishing to be bound by theory, at least two of the first, second, third, and fourth stress regions 726, 728, 730, and 732 are predicted to be under different primary stresses. For example, the second stress region 728 may be under a compressive stress as a result of gravitational loads supplied by upper portions of the green body part 724. The third stress region 730 may be under a tensile stress resulting from different portions of the green body part 724 shrinking in different directions. In embodiments, stress regions are identified based on groupings of elements 720 of the mesh 718 predicted to be subjected to relatively similar stress loads as a result of the sintering. In embodiments, adjacent stress regions may be distinct from one another even if they are estimated to be subjected to same type of stress. That is, stress regions may be distinct from one other if they differ from one another only in the magnitude of a particular type of stress.

Referring again to FIG. 8, after stress regions of the green body part are identified, different sets of material property values are assigned to each of the stress regions at block 712. As described herein, via performance of the method 600, a plurality of stress differentiating material property sets may be generated for a particular material configuration. Each stress differentiating material property set may be associated with a particular stress state (e.g., classified based on both type of stress and magnitude). Stress differentiating material property sets associated with the stress state of each stress region identified at block 710 may be retrieved and assigned to that stress region to form a stress-simulated green body part. The stress-simulated green body part thus does not possess uniform material properties, but rather regions having material properties that differ based on the stress predicted to be present in that region.

Figure 9D:
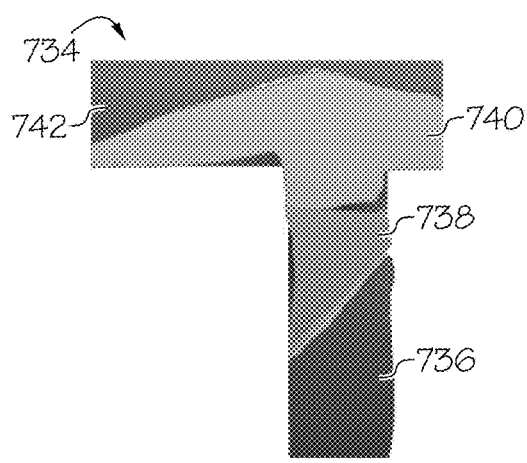
FIG. 9D schematically depicts a stress-simulated green body part, according to one or more embodiments described herein.

FIG. 9D depicts a stress-simulated green body part 734 formed from the green body part 724 described with respect to FIGS. 9B and 9C. The stress-simulated green body part 734 is constructed of a first material 736, a second material 738, a third material 740, and a fourth material 742. The first material 736 includes a first set of material properties and is disposed in the first stress region 726 (see FIG. 9B). The second material 738 includes a second set of material properties and is disposed in the second stress region 728. The third material 740 includes a third set of material properties and disposed in the third stress region 730. The fourth material 742 is includes a fourth set of material properties and is disposed in the fourth stress region 732. The first, second, third, and fourth set of material properties of the first, second, third, and fourth materials 736, 738, 740, and 742 may differ from one another in that they each include at least one stress differentiating material property having a value that differs from that of the others (or at least differs from that of adjacent regions).

As will be appreciated, the identity of any stress differentiating material properties that differ from one another will depend on the particular material configuration being simulated. In one example, each of the first, second, third, and fourth materials 736, 738, 740, and 742 may have a different Young's modulus. In another example, the stress differentiating material property that differs between each of the first, second, third, and fourth materials 736, 738, 740, and 742 may not comprise a single value, but a series of values defining a relationship characterizing the materials. For example, where a non-linear material analysis is employed, each of the first, second, third, and fourth materials 736, 738, 740, and 742 may be assigned a different polynomial stress-strain curve. In embodiments, the different material property sets assigned to each of the first, second, third, and fourth materials 736, 738, 740, and 742 may share values for certain stress differentiating material properties, but may differ from one another in terms of combinations of the stress differentiating material properties that they contain.

Referring again to FIG. 8, after the stress-simulated green body part is generated, the stress-simulated green body part is subjected to a second sintering analysis at block 714. In embodiments, the second sintering analysis is performed via the predictive analyzer 518 of the distortion prediction system 500 depicted in FIG. 5. As described herein, the predictive analyzer 518 may utilize a second finite element analysis framework using second sets of loading and boundary conditions. In embodiments, the second finite element analysis is similar in form to the first finite element analysis utilized by the preliminary analyzer 516 of the distortion prediction system 500, but uses the different sets of material properties of the stress-simulated green body part in carrying out the analysis. For example, the mesh 718 described herein with respect to FIG. 9A may be used in the second finite element analysis to predict the dislocation of each node 722 within the stress-simulated green body part.

Figure 9E:
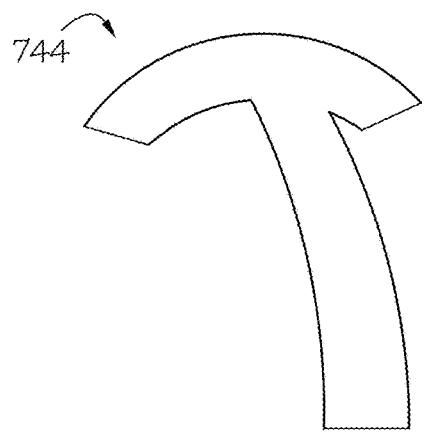
FIG. 9E schematically depicts a post-sintering geometry of the green body part depicted in FIG. 9B, according to one or more embodiments described herein.

At block 716, a post-sintering geometry for the green body part is output by the distortion prediction system 500. In embodiments, the combined dislocations of the plurality of nodes 722 within the simulated green body part provide an overall predicted distortion of the green body part during sintering. For example, FIG. 9E depicts a post-sintering geometry 744 for the green body part 724 depicted in FIG. 9B. The post-sintering geometry 744 significantly deviates in shape from the green body part 724. In embodiments, the post-sintering geometry 744 is used to pre-distort a green scaled CAD part model such that a post-sintering workpiece formed from the pre-distorted green scaled CAD part model possess a geometry corresponding to the CAD part model after sintering. In embodiments, the post-sintering geometry 744 is output to a display of the distortion prediction system 500 to enable a user to view the post-sintering geometry 744.

In view of the foregoing description, it should be appreciated that predicting a distortion of a green body part during sintering by assigning different sets of material properties to different regions of the green body part based on predicted stress states of the regions of the green body part facilitates a more accurate prediction of the distortion. By incorporating material property inhomogeneity into the distortion prediction analysis, the systems and methods described herein incorporate more realistic conditions that green body parts are subjected to during sintering. The systems and methods described herein may reduce the need for post-printing and sintering part redesign, rendering binder jet additive manufacturing more capable of producing larger parts having more complex geometries than previously possible. By utilizing the systems and methods described herein, parts may be pre-designed to incorporate distortion that results during sintering such that sintered parts possess a desired geometry.

Further aspects of the invention are provided by the subject matter in the following clauses:

1. A method of predicting a post-sintering geometry of a green body part after sintering, the method comprising: determining, by a computing system, stress differentiating material properties of a material configuration of the green body part by physically measuring the stress differentiating material properties of the material configuration; identifying, by the computing system, a plurality of stress regions in the green body part via a first sintering analysis of the green body part, wherein each stress region is associated with a portion of the green body part subjected to a particular stress state during sintering; assigning, by the computing system, different sets of stress differentiating material properties to each of the plurality of stress regions to form a stress-simulated green body part; and predicting, by the computing system, the post-sintering geometry via a second sintering analysis of the stress-simulated green body part.

2. The according to any preceding clause, wherein the first sintering analysis comprises a first finite element analysis, the first finite element analysis comprising a first set of loading parameters for the green body part during the sintering.

3. The method according to any preceding clause, wherein the second sintering analysis comprises a second finite element analysis, the second finite element analysis comprising a second set of loading parameters for the green body part during the sintering, wherein the first set of loading parameters are different from the second set of loading parameters.

4. The method according to any preceding clause, wherein the first set of loading parameters is a scaled-down version of the second set of loading parameters.

5. The according to any preceding clause, wherein the first finite element analysis utilizes a single set of material properties for an entirety of the green body part.

6. The method according to any preceding clause, wherein the first set of loading parameters and the second set of loading parameters both include a frictional load and a gravitational load.

7. The method according to any preceding clause, wherein the stress differentiating material properties are material properties that differ from one another when the material configuration is in different stress states by greater than or equal to 5%.

8. The method according to any preceding clause, wherein the stress differentiating material properties include at least one of Young's modulus, shear modulus, bulk modulus, Poisson's ratio, density, tensile strength, yield strength, and hardening modulus.

9. The method according to any preceding clause, wherein each the plurality of stress regions in the green body part is under one of a tensile stress, a compressive stress, or a strain.

10. The method according to any preceding clause, wherein the material configuration is associated with a particulate material used to produce the green body part via a binder jet printing apparatus.

11. The method according to any preceding clause, wherein the determining the stress differentiating material properties of the material configuration of the green body part by physically measuring the stress differentiating material properties of the material configuration comprises: printing a plurality of test coupons having the material configuration of the green body part using an additive manufacturing apparatus, each of the plurality of test coupons including a test portion subjected to a different one of a plurality of stress states during sintering; sintering each of the plurality of test coupons within a sintering furnace to produce a plurality of sintered test coupons derived from each of the plurality of test coupons, each of the sintered test coupons including stress portions subjected to the different stress states; measuring material properties of each of the sintered test coupons; and identifying material properties that differ between each of the plurality of sintered test coupons by more than a threshold.

12. A method of predicting a post-sintering geometry of a green body part after sintering, the method comprising: measuring stress differentiating material properties of a material configuration of the green body part while the material configuration is placed in a plurality of different stress states due to application of a load to the material configuration; receiving, by a computing system, a geometry for a workpiece to be printed by a binder jet printing apparatus; scaling, by the computing system, the geometry for the workpiece to generate a green body part geometry; identifying, by the computing system, boundaries of a plurality of stress regions within the green body part geometry by performing a first finite element analysis on the green body part geometry; assigning, by the computing system, different sets of stress differentiating material properties to each of the plurality of stress regions to form a stress-simulated green body part; and predicting, by the computing system, the post-sintering geometry by performing a second finite element analysis on the stress-simulated green body part.

13. The method according to any preceding clause, wherein the first finite element analysis comprises a first set of loading parameters and the second finite element analysis comprises a second set of loading parameters, the first set of loading parameters being different from the second set of loading parameters.

14. The method according to any preceding clause, wherein the first set of loading parameters is a scaled-down version of the second set of loading parameters.

15. The method according to any preceding clause, wherein the first set of loading parameters and the second set of loading parameters both include a friction load and a gravitational load.

16. The method according to any preceding clause, wherein the first finite element analysis utilizes a single set of material properties for an entirety of the green body part.

17. The method according to any preceding clause, wherein the measuring the stress differentiating material properties of the material configuration of the green body part while the material configuration is placed in the plurality of different stress states due to application of the load to the material configuration comprises: printing a plurality of test coupons having the material configuration of the green body part using an additive manufacturing apparatus, each of the plurality of test coupons including a test portion subjected to a different one of the plurality of stress states during sintering; sintering each of the plurality of test coupons within a sintering furnace to produce a plurality of sintered test coupons derived from each of the plurality of test coupons, each of the sintered test coupons including stress portions subjected to the different stress states; measuring material properties of each of the sintered test coupons; and identifying material properties that differ between each of the plurality of sintered test coupons by more than a threshold.

18. A system comprising: one or more processors; one or more non-transitory memory modules communicatively coupled to the one or more processors and storing machine-readable instructions that, when executed, cause the one or more processors to: determine stress differentiating material properties of a material configuration of the green body part; identify a plurality of stress regions in the green body part via a first sintering analysis of the green body part, wherein each stress region is associated with a portion of the green body part subjected to a particular stress state during the sintering; assign different sets of stress differentiating material properties to each of the plurality of stress regions to form a stress-simulated green body part; and predict the post-sintering geometry via a second sintering analysis of the stress-simulated green body part; and an additive manufacturing apparatus that receives the post-sintering geometry and prints a workpiece of the material configuration, the workpiece having a workpiece geometry that is based at least in part on the post-sintering geometry.

19. The system according to any preceding clause, wherein the first sintering analysis comprises a first finite element analysis comprises a first set of material properties and the second sintering analysis comprises a second finite element analysis utilizing a second set of material properties, wherein the first set of material properties is a scaled-down version of the second set of material properties.

20. The system according to any preceding clause, wherein the stress differentiating material properties include at least one of Young's modulus, shear modulus, bulk modulus, Poisson's ratio, density, tensile strength, yield strength, and hardening modulus.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A method of predicting a post-sintering geometry of a green body part after sintering, the method comprising:
   determining, by a computing system, stress differentiating material properties of a material configuration of the green body part by physically measuring the stress differentiating material properties of the material configuration;
   identifying, by the computing system, a plurality of stress regions in the green body part via a first sintering analysis of the green body part, wherein each stress region is associated with a portion of the green body part subjected to a particular stress state during sintering, wherein the first sintering analysis simulates a process comprising heating at least a portion of the green body part to one or more elevated temperatures;
   assigning, by the computing system, different sets of stress differentiating material properties to each of the plurality of stress regions to form a stress-simulated green body part; and predicting, by the computing system, the post-sintering geometry via a second sintering analysis of the stress-simulated green body part.

2. The method of claim 1, wherein the first sintering analysis comprises a first finite element analysis, the first finite element analysis comprising a first set of loading parameters for the green body part during the sintering.

3. The method of claim 2, wherein the second sintering analysis comprises a second finite element analysis, the second finite element analysis comprising a second set of loading parameters for the green body part during the sintering, wherein the first set of loading parameters are different from the second set of loading parameters.

4. The method of claim 3, wherein the first set of loading parameters is a scaled-down version of the second set of loading parameters.

5. The method of claim 3, wherein the first finite element analysis utilizes a single set of material properties for an entirety of the green body part.

6. The method of claim 3, wherein the first set of loading parameters and the second set of loading parameters both include a frictional load and a gravitational load.

7. The method of claim 1, wherein the stress differentiating material properties are material properties that differ from one another when the material configuration is in different stress states by greater than or equal to 5%.

8. The method of claim 1, wherein the stress differentiating material properties include at least one of Young's modulus, shear modulus, bulk modulus, Poisson's ratio, density, tensile strength, yield strength, and hardening modulus.

9. The method of claim 1, wherein each the plurality of stress regions in the green body part is under one of a tensile stress, a compressive stress, or a strain.

10. The method of claim 1, wherein the material configuration is associated with a particulate material used to produce the green body part via a binder jet printing apparatus.

11. The method of claim 1, wherein the determining the stress differentiating material properties of the material configuration of the green body part by physically measuring the stress differentiating material properties of the material configuration comprises:
   printing a plurality of test coupons having the material configuration of the green body part using an additive manufacturing apparatus, each of the plurality of test coupons including a test portion subjected to a different one of a plurality of stress states during sintering;
   sintering each of the plurality of test coupons within a sintering furnace to produce a plurality of sintered test coupons derived from each of the plurality of test coupons, each of the sintered test coupons including stress portions subjected to the different stress states;
   measuring material properties of each of the sintered test coupons; and
   identifying material properties that differ between each of the plurality of sintered test coupons by more than a threshold.

12. A method of predicting a post-sintering geometry of a green body part after sintering, the method comprising:
   measuring stress differentiating material properties of a material configuration of the green body part while the material configuration is placed in a plurality of different stress states due to application of a load to the material configuration;
   receiving, by a computing system, a geometry for a workpiece to be printed by a binder jet printing apparatus;
   scaling, by the computing system, the geometry for the workpiece to generate a green body part geometry;
   identifying, by the computing system, boundaries of a plurality of stress regions within the green body part geometry by performing a first sintering analysis on the green body part comprising a first finite element analysis on the green body part geometry, wherein the first sintering analysis simulates a process comprising heating at least a portion of the green body part to one or more elevated temperatures;
   assigning, by the computing system, different sets of stress differentiating material properties to each of the plurality of stress regions to form a stress-simulated green body part; and
   predicting, by the computing system, the post-sintering geometry by performing a second finite element analysis on the stress-simulated green body part.

13. The method of claim 12, wherein the first finite element analysis comprises a first set of loading parameters and the second finite element analysis comprises a second set of loading parameters, the first set of loading parameters being different from the second set of loading parameters.

14. The method of claim 13, wherein the first set of loading parameters is a scaled-down version of the second set of loading parameters.

15. The method of claim 13, wherein the first set of loading parameters and the second set of loading parameters both include a friction load and a gravitational load.

16. The method of claim 12, wherein the first finite element analysis utilizes a single set of material properties for an entirety of the green body part.

17. The method of claim 12, wherein the measuring the stress differentiating material properties of the material configuration of the green body part while the material configuration is placed in the plurality of different stress states due to application of the load to the material configuration comprises:
   printing a plurality of test coupons having the material configuration of the green body part using an additive manufacturing apparatus, each of the plurality of test coupons including a test portion subjected to a different one of the plurality of stress states during sintering;
   sintering each of the plurality of test coupons within a sintering furnace to produce a plurality of sintered test coupons derived from each of the plurality of test coupons, each of the sintered test coupons including stress portions subjected to the different stress states;
   measuring material properties of each of the sintered test coupons; and
   identifying material properties that differ between each of the plurality of sintered test coupons by more than a threshold.

18. A system comprising:
one or more processors;
one or more non-transitory memory modules communicatively coupled to the one or more processors and storing machine-readable instructions that, when executed, cause the one or more processors to:
   determine stress differentiating material properties of a material configuration of the green body part;
   identify a plurality of stress regions in the green body part via a first sintering analysis of the green body part, wherein each stress region is associated with a portion of the green body part subjected to a particular stress state during the sintering, wherein the first sintering analysis simulates a process comprising heating at least a portion of the green body part to one or more elevated temperatures;

assign different sets of stress differentiating material properties to each of the plurality of stress regions to form a stress-simulated green body part; and predict the post-sintering geometry via a second sintering analysis of the stress-simulated green body part; and an additive manufacturing apparatus that receives the post-sintering geometry and prints a workpiece of the material configuration, the workpiece having a workpiece geometry that is based at least in part on the post-sintering geometry.

19. The system of 18, wherein the first sintering analysis comprises a first finite element analysis comprises a first set of material properties and the second sintering analysis comprises a second finite element analysis utilizing a second set of material properties, wherein the first set of material properties is a scaled-down version of the second set of material properties.

20. The system of claim 19, wherein the stress differentiating material properties include at least one of Young's modulus, shear modulus, bulk modulus, Poisson's ratio, density, tensile strength, yield strength, and hardening modulus.

\* \* \* \* \*